(12) United States Patent
Meinherz et al.

(10) Patent No.: US 7,378,759 B2
(45) Date of Patent: May 27, 2008

(54) DISCONNECTING SWITCH ASSEMBLY

(75) Inventors: Manfred Meinherz, Berlin (DE); Eckhard Wagner, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 205 days.

(21) Appl. No.: 10/559,284

(22) PCT Filed: May 3, 2004

(86) PCT No.: PCT/DE2004/000966

§ 371 (c)(1),
(2), (4) Date: Dec. 2, 2005

(87) PCT Pub. No.: WO2004/109878

PCT Pub. Date: Dec. 16, 2004

(65) Prior Publication Data

US 2006/0138088 A1  Jun. 29, 2006

(30) Foreign Application Priority Data

Jun. 2, 2003  (DE) ............................. 103 25 683

(51) Int. Cl.
*B23K 11/24* (2006.01)
(52) U.S. Cl. .................................... 307/112
(58) Field of Classification Search ................. 307/112
See application file for complete search history.

(56) References Cited

U.S. PATENT DOCUMENTS 4,413,166 A  * 11/1983  Meyer .......................... 218/80
4,440,996 A     4/1984  Calvino
4,659,886 A  *  4/1987  Olsen et al. ................... 218/45
6,459,568 B2   10/2002  Matsushita et al.

FOREIGN PATENT DOCUMENTS

| DE | 296 20 438 U1 | 3/1997 |
|----|---------------|--------|
| DE | 198 39 535 A1 | 3/2000 |
| DE | 199 08 304 A1 | 8/2000 |
| DE | 100 11 888 A1 | 10/2001 |
| EP | 0 829 937 A2  | 3/1998 |
| EP | 1 174 968 A1  | 1/2002 |
| EP | 1 207 601 A2  | 5/2002 |
| JP | 54053237 A    | 4/1979 |
| WO | WO 00/45486   | 8/2000 |

* cited by examiner

Primary Examiner—Robert L. DeBeradinis
(74) Attorney, Agent, or Firm—Laurence A. Greenberg; Werner H. Stemer; Ralph E. Locher

(57) ABSTRACT

The invention relates to a disconnecting switch assembly for disconnecting air-insulated electrical lines, which have one or more phases, with at least one grounded housing that is filled with protective gas, with open air ducts, which are attached to the housing(s) in a gastight manner and which each have an open-air connection for connecting the lines, and with gas-insulated disconnecting switches, which are placed inside the open-air ducts. At least three open air ducts are provided for each phase whose open-air connections can be electrically connected to one another by means of the disconnecting switch over current path piece mounted inside the housing.

18 Claims, 1 Drawing Sheet

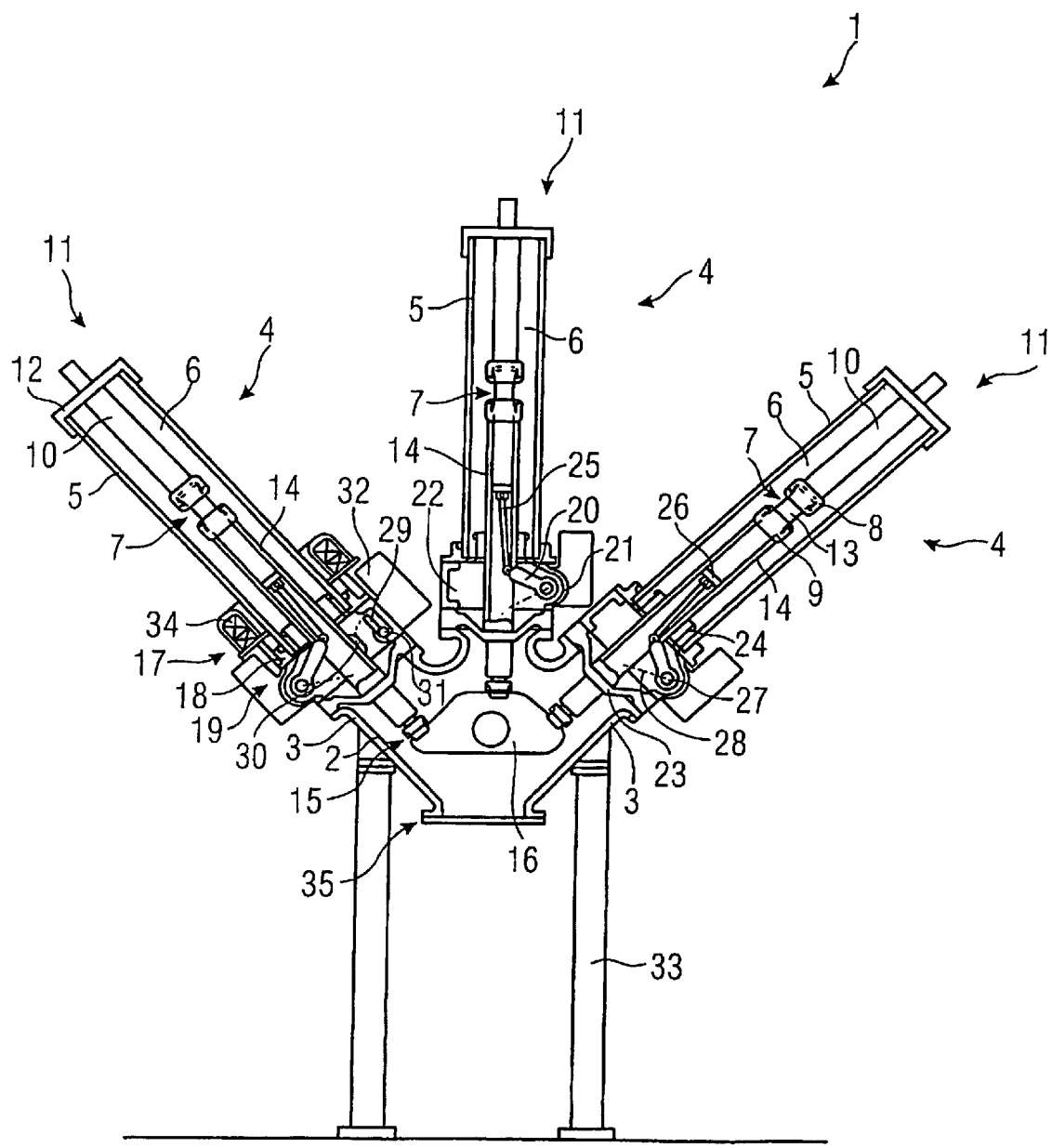

DISCONNECTING SWITCH ASSEMBLY

CLAIM FOR PRIORITY

This application is a national stage of PCT/DE2004/000966 which was published on May 3, 2004 and which claims the benefit of priority to German Application No. 103 25 683.0 filed Jun. 2, 2003.

TECHNICAL FIELD OF THE INVENTION

The invention relates to a switch disconnector arrangement for disconnection of air-insulated electrical lines.

BACKGROUND OF THE INVENTION

By way of example, switch disconnector arrangements are known from DE 198 39 535 A1. The switch disconnector arrangement disclosed there has air-insulated switch disconnectors with two pivoting arms, with the pivoting arms being provided with switching contacts at the ends. In a contact position, the switching contacts rest on mating contacts of live lines or busbars. The pivoting arms are disconnected from the mating contacts by introduction of a pivoting movement, so that the lines are interrupted. Air-insulated switch disconnector arrangements are space-consuming, owing to the minimum separations which have to be complied with in air. Furthermore, the contacts of the switch disconnectors are subject to weather influences, and these have a disadvantageous influence on them.

Furthermore, separately installed switch disconnectors with inert gas insulation are known.

U.S. Pat. No. 4,440,996 discloses a gas-insulated switchgear installation which has a metallic enclosure, with a Y-shaped cross section, at ground potential. The enclosure forms connecting stubs for fitting outdoor bushings in a gas-tight manner. A circuit breaker is arranged in the outdoor bushings and has a stationary contact and a moving contact, which is guided such that it can move with respect to the stationary contact. In order to quench any arc that is struck on disconnection of the contacts of the circuit breaker, the arc is blown with a quenching gas.

U.S. Pat. No. 6,459,562 B2, discloses a switchgear assembly having a metallic enclosure which is at ground potential and is connected to outdoor bushings in a gas-tight manner. A circuit breaker is provided within one of the outdoor bushings while, in contrast, one or two switch disconnectors is or are arranged in the metallic enclosure.

EP 1 207 601 A2 discloses a switchgear assembly having a metallic enclosure which is installed in an isolated form and to which hollow cylinders, which are manufactured from dielectric material, are attached. Both switch disconnectors and circuit breakers are arranged in the hollow cylinders. The metallic enclosure is at a high-voltage potential. The isolated installation of the enclosure is achieved by means of a hollow cylinder which is manufactured from dielectric material and is supported on a grounded foundation. Isolating rods extend through the supporting hollow cylinder and introduce a drive movement, which is produced by a grounded drive unit, into the metallic enclosure, which is at high-voltage potential.

EP 1 174 968 A1 discloses a high-voltage switchgear assembly which has a gas-insulated busbar, a gas-insulated metallic enclosure at ground potential, and an outdoor bushing, which is connected in a gas-tight manner to the enclosure, for connection of an air-insulated high-voltage cable. A circuit breaker is provided in the outdoor bushing, in order to interrupt the current flow. In contrast, at least one switch disconnector is provided in the gas-insulated enclosure and opens with no current flowing after the current has been interrupted, in order to provide a sufficiently long isolating gap and thus permanent interruption of the current flow through the switchgear assembly.

DE 296 20 438 U1 discloses an encapsulating enclosure for a gas-insulated switchgear assembly. A switch drive enclosure, which is intended to hold at least one driveshaft, is integrally formed on the encapsulating enclosure.

JP 5453237 A discloses a switchgear assembly which has a metallic enclosure which is at ground potential and in which a circuit breaker is arranged. Connecting stubs, to each of which an outdoor bushing is attached in a gas-tight manner, are integrally formed on the metallic enclosure. Switch disconnectors are provided in the outdoor bushing. In this case, the outdoor bushings are formed from a hollow-cylindrical ceramic tube and an intermediate enclosure which lengthens the ceramic tube. The intermediate enclosure is designed to hold and provide a bearing for the switch disconnector drive.

SUMMARY OF THE INVENTION

One object of the invention is to provide a compact switch disconnector arrangement which can be used to provide a large number of electrical circuits, in particular for high voltages.

The invention achieves this object by a switch disconnector arrangement for disconnection of air-insulated electrical lines which have one or more phases, having at least one grounded enclosure which is filled with inert gas, having outdoor bushings which are attached to the enclosure or enclosures and each have an outdoor connection for connection of the lines, and having gas-insulated switch disconnectors which are arranged in the outdoor bushings, with at least three outdoor bushings being provided for each phase, whose outdoor connections can be electrically connected to one another by means of the switch disconnectors via a pole element which is arranged in one of the enclosures, and with each outdoor bushing having a switch disconnector.

The switch disconnector arrangement according to the invention allows the switch disconnectors in an outdoor switchgear assembly to be combined to form an assembly which is insulated by inert gas and is thus compact. The switch disconnectors are no longer installed as individual appliances with individual foundations, but either have a single enclosure or a separate enclosure for each phase, which can be installed on only one frame with a single foundation. In this case, the switch disconnector arrangement according to the invention is suitable for a large number of switching plan applications. Just by way of example, the link between a double busbar in a three-phase network and a transformer branch or the connection of two network branches in a so-called H circuit may be mentioned. In contrast to already known air-insulated switch disconnector arrangements, the switch disconnector arrangement according to the invention furthermore has a compact form.

In one preferred further development of the invention, the outdoor bushings which are associated with one phase are arranged in the form of a fan on one plane. In this case, all the pairs of adjacent outdoor bushings for one phase cover the same angle in their longitudinal extent with respect to the pole element. The outdoor connections which are arranged at the ends of the outdoor bushings are thus as far apart from one another as possible. For this reason, the outdoor bushings may be designed to have a correspondingly shorter length without any need to be concerned about voltage flashovers between the outdoor connections. This allows the switch disconnector arrangement to have a form which is even more compact.

In one further development in this context, the outdoor bushings which are associated with one phase each run on one plane, with the planes of the various phases being aligned parallel to one another.

Insulating posts which are composed of dielectric material are expediently provided in order to hold the pole element or pieces in the enclosure or enclosures. The insulating posts, which are produced from a non-conductive plastic, a ceramic or, for example, a cast resin, provide an insulating holder for the pole element, which is, for example, at a high-voltage potential during operation, on the grounded enclosure, with one or multiple pole encapsulation.

A grounding switch is advantageously provided for each phase. The grounding switch can simultaneously ground all of the drive-side contact pieces of the switch disconnectors and the pole element for one phase and, for example, can be arranged in the enclosure, which encapsulates three poles or one pole.

The grounding switch is advantageously arranged in the outdoor bushing. This means that there is no need to provide bearings for the grounding switch in the enclosure.

Each switch disconnector is advantageously held in the outdoor bushing by means of holding means, which are composed of dielectric material. The holding means ensure that the switch disconnector is held in the outdoor bushing independently of the pole element. This allows the outdoor bushing to be produced as an independent component together with the switch disconnector, and to be connected on site to the respective enclosure and to the respective pole element, for example via an expedient plug-in contact. The plug-in contact or other link between the switch disconnector and the associated pole element provides additional retention for the switch disconnector, and makes the switch disconnector more robust.

The holding means are advantageously gas-tight. By way of example, a bulkhead bushing may be used as a gas-tight holding means, bounding a disconnector gas area which is formed in the outdoor bushing. In this case, a connecting conductor which is electrically connected to the switch disconnector passes centrally through the bulkhead bushing and is connected in a gas-tight manner to the bulkhead bushing via expedient sealing means. The disconnector gas area thus forms a disconnector gas area which is independent of the busbar area of the enclosure and which, for example, can be filled with a different gas and can have a different pressure applied to it.

In contrast to this, the holding means are gas-permeable, so that a common gas area which is composed of the disconnector gas area and the busbar area is formed, and can be checked for leaks by means of a common sealing test.

The switch disconnector advantageously has contact pieces whose ends are located opposite one another, with the switch disconnector advantageously having contact pieces which are located opposite one another at the ends, in which case the switch disconnector can be moved to a disconnected position by initiation of a linear movement from a contact position which allows current to flow, in which disconnected position an electrically isolating gap is provided between the contact pieces.

According to this expedient further development of the invention, this refinement of the switch disconnector is very largely matched to a homogeneous cylindrical conductor which extends in an axial direction, so that it is possible to make use of experience with conventional outdoor bushings which do not have any switch disconnectors in their interior. This applies not only to their sizes, but also to the material used.

The switch disconnector expediently has a stationary female contact and a sliding contact, which is firmly supported via a hollow connecting rod on attachment means for the outdoor bushing, with a switching pin, which is guided by the sliding contact such that it can move, being provided for making contact with the female contact, and being driven via drive means which are arranged in the connecting conductor. The drive means which are arranged in the hollow connecting conductor, for example coupling rods, pivoting levers or the like, are encapsulated in this way, so that voltage peaks on corners and edges of the drive means are avoided, and thus partial discharges, on corners and edges of the drive means are avoided, even during a drive movement. Furthermore, the switch disconnector has two stationary contact pieces which can be held in a simple manner. This therefore avoids a complex moving bearing for a contact piece on the attachment means.

In a further expedient refinement of the invention, at least one driveshaft is provided in order to introduce a drive movement into the switch disconnector. In this case, each drive shaft is mounted by means of an expedient rotating bearing in the attachment means of the outdoor bushing, with expedient sealing means ensuring that the driveshaft passes through, for example, the outer wall of the attachment means in a gas-tight manner.

The driveshaft may, of course, also be mounted in a gas-tight manner in the enclosure.

The drive movement according to this embodiment of the invention can be introduced via a rotary movement into the interior of the outdoor bushing, which is gas-insulated during operation.

According to one expedient further development of the invention, an isolating rocker which is composed of a dielectric material is provided in order to introduce a drive movement. The isolating rocker is, for example, mechanically connected to a coupling rod which forms a switching pin at its end that is remote from the isolating rocker, which switching pin produces the conductive connection between the contact pieces of the switch disconnector when the latter is in the contact position. The isolating rocker converts a rotary movement as the drive movement to a linear movement, and introduces a translational movement into the switch disconnector, in which case the latter is designed appropriately as a push-type switch.

Field control elements are expediently provided in order to avoid partial discharges in the outdoor bushing.

Furthermore, a display element may be advantageous in order to indicate the position of the switch disconnector and/or of the grounding switch.

At least one outdoor bushing is advantageously equipped with a current transformer. The secondary of the current transformer is connected to the grounded enclosure and may be in the form of an current adaptor, so that there is no need to open the common or separate gas area or areas if it becomes necessary to replace the current adaptor.

At least one drive unit, which is supported on the outdoor bushing, is advantageously provided in order to produce a drive movement. This allows the outdoor bushing to be produced as a ready-for-use individual component, independently of the enclosure.

The switch disconnector arrangement according to the invention expediently has a voltage transformer. By way of example, the voltage transformer may be attached to the enclosure.

Further expedient refinements and advantages of the invention are the subject matter of the following description of exemplary embodiments of the invention, with reference to the single FIGURE in the drawing, in which:

BRIEF DESCRIPTION OF THE DRAWINGS

FIG. 1 shows one exemplary embodiment of the gas-insulated switch disconnector arrangement, in the form of a sectioned side view.

DETAILED DESCRIPTION OF THE INVENTION

FIG. 1 shows one exemplary embodiment of the gas-insulated switch disconnector arrangement 1 according to the invention, in the form of a sectioned side view. The illustrated switch disconnector arrangement 1 has an enclosure 2 which is at ground potential and has three connecting stubs 3 which are each designed to produce a gas-tight connection to one of the outdoor bushings 4. Only three outdoor bushings 4, which are arranged in the form of a fan on one plane, can be seen in FIG. 1. These three outdoor bushings 4 are associated with one phase of a three-phase network. The remaining outdoor bushings 4 for the other phases are offset into the plane of the drawing in FIG. 1, and are in each case arranged aligned with one of the illustrated outdoor bushings 4. In total, nine outdoor bushings 4 are attached to the enclosure 2.

The outdoor bushing 4 has a hollow-cylindrical isolator 5 with a cavity 6 for holding a switch disconnector 7. The switch disconnector 7 comprises a stationary female contact 8 and a sliding contact 9, which is likewise stationary, with the female contact 8 being connected via a contact rod 10 to an outdoor connection 11 for connection of an air-insulated high-voltage line, which is not shown. At the end, the outdoor connection 11 is arranged on the isolator 5 and has a closure cap 12 which is connected to the isolator 5 in a gas-tight manner by adhesive means, and closes the cavity 6 such that it is gas-tight.

A switching pin 13 is guided in the sliding contact 8 such that it can move, with the sliding contact 9 being electrically connected to a pole element 16, which is arranged in the enclosure 2, via a hollow connecting conductor 14 and via a plug-in contact 15. Insulating posts are provided on the enclosure 2 in order to hold the pole element 16, but are not illustrated in FIG. 1.

The pole element 16 produces an electrical connection between the sliding contacts 9 of one phase. In other words, the contact rods 10, the female contacts 8, the switching pins 13, the sliding contacts 9, the connecting conductors 14, the plug-in contacts 19 and the pole element 16 produce a conductive connection between all of the outdoor connections 11 of one phase when all of the switch disconnectors 7 are in a contact position, in which the switching pin 13 has been moved into the female contact 8.

At the end of the isolator 5 that is remote from the outdoor connection 11, each outdoor bushing 4 has attachment means 17 which are produced from a metallic material, for example aluminum, and a flange section 18 which is adhesively bonded to the isolator 5, and an intermediate enclosure 19. The interiors of the attachment means 17 are likewise tubular, and they have a linear profile in the direction of the longitudinal extent of the isolator 5. Each intermediate enclosure 19 is firmly screwed to a connecting stub 3 via a flange connection, with sealing means which cannot be seen ensuring a gas-tight link between the outdoor bushing 4 and the enclosure 2.

An electrically non-conductive isolating rocker 20, which is arranged in the intermediate enclosure 19, is provided in order to introduce a switching movement into the switching pin 13, with side holding caps 21 being provided for gas-tight closure of an intermediate cavity 22, which is bounded by the intermediate enclosure 19. The intermediate cavity 22 enlarges the cavity 6.

A gas-tight bulkhead bushing 23 is provided as a holding means or as a holder in order to hold the sliding contact 9 above the connecting conductor 14, and is mounted firmly between the intermediate enclosure 19 and the grounded connecting stub 3. In this case, the connecting rod 14 passes through the center of the bulkhead bushing 23, with sealing means which cannot be seen in FIG. 1 ensuring gas-tight connection between the connecting rod 14 and the bulkhead bushing 23. In this way, the cavity 6 forms a separate, gas-tight disconnector gas area, which can be filled with its own quenching or insulating gas, such as sulfur hexafluoride. In the operating state, in which all of the outdoor bushings are installed, the enclosure likewise bounds a closed enclosure gas area, which is likewise filled with a conventional insulating gas.

The bulkhead bushing 23 is produced from a dielectric material, such as cast resin.

The outdoor connection 11 is intended for connection of an air-insulated high-voltage line, which is not illustrated in the FIGURE, while in contrast the enclosure 2 is at ground potential. In order to avoid voltage peaks resulting from high electrical field strengths on corners and edges of the attachment means 17, field control elements 24 are provided, and are electrically connected to the attachment means 17 and to the enclosure 2.

A coupling rod 25 is provided in order to transmit the drive movement from the isolating rocker 20 to the switching pin 13, is articulated on the isolating rocker 20 and is firmly connected to the switching pin 13 via a switching pin guide 26 at its end remote from the isolating rocker 20. As can be seen, the switching pin 13 and the switching pin guide 26 are arranged within the hollow connecting conductor 14, which for this reason is used as a guide means in addition to providing a purely electrical connection. In order to allow movement of the isolating rocker 20, the connecting conductor 14 has a side opening opposite the isolating rocker 20.

The isolating rocker 20 is furthermore connected to a driveshaft 27 such that they rotate together, and the driveshaft 27 is passed out of the intermediate enclosure 19 via a rotating bearing which is expediently equipped with sealing means. Rotation of the driveshaft 27 moves the isolating rocker 20 to a disconnected position 28, which is indicated in FIG. 1 and in which the switching pin 13 is withdrawn from the female contact 8, so that an isolating gap is formed between the female contact 8 and the sliding contact 9.

A grounding switch 29 can be seen in the outdoor bushing 4 which is shown on the left, on the holding cap 21 and opposite the isolating rocker 20, with the purpose of grounding all of the drive-side contact pieces of the switch disconnectors 7 for one phase once the switch disconnector 7 has been opened. For this purpose, the grounding switch 29 produces a conductive connection between a ground contact 30, which is at the same potential as the connecting conductor 14, and the enclosure 2, which is at ground potential.

A grounder shaft 31, which is passed out of the intermediate enclosure 19, is provided in order to drive the grounding switch 29. Furthermore, a drive box 32, which is attached to the intermediate enclosure 19, is provided in order to accommodate drive units. The drive units are designed to produce a drive movement for the driveshaft 21 and, to some extent, for the grounder shaft 31.

The enclosure 2 and thus the entire switch disconnector arrangement are connected via a supporting frame 33 to a foundation, which is not illustrated in the FIGURE.

The outdoor bushing 4 is also equipped with a current adaptor 34. A connecting stub 35 for connection of a voltage transformer, which is not illustrated, can be seen underneath the housing 2.

What is claimed is:

1. A switch disconnector arrangement for disconnecting air-insulated electrical lines of at least one phase, the switch disconnector arrangement comprising:
    at least one grounded enclosure filled with an inert gas;
    a pole element located in said enclosure; and
    at least three outdoor bushings provided for one phase of the electrical lines, said outdoor bushings attached to said enclosure in a gas-tight manner, each of said outdoor bushings including an outdoor connection for connecting the electrical lines of the one phase, each of said outdoor bushings including a gas-insulated switch disconnector located therein;
    said outdoor connection of each of said outdoor bushings, which are provided for one phase of the electrical lines, being electrically connected together by said switch disconnector of each one of said outdoor bushings and said pole element.

2. The switch disconnector arrangement according to claim 1, wherein said outdoor bushings, which are provided for one phase of the electrical lines, are located to form a fan on one plane.

3. The switch disconnector arrangement according to claim 1, further comprising:
    a plurality of posts holding said pole element in said enclosure;
    said plurality of posts made of a dielectric material.

4. The switch disconnector arrangement according to claim 1, further comprising a grounding switch.

5. The switch disconnector arrangement according to claim 4, wherein said grounding switch is located in one of said outdoor bushings.

6. The switch disconnector arrangement according to claim 1, wherein each of said outdoor bushings includes holding means holding said switch disconnector therein, and said holding means is made of a dielectric material.

7. The switch disconnector arrangement according to claim 6, wherein said holding means is gas-tight.

8. The switch disconnector arrangement according to claim 6, wherein said holding means is gas-permeable.

9. The switch disconnector arrangement according to claim 1, wherein:
    said switch disconnector includes a plurality of contact pieces including ends located opposite one another; and
    said switch disconnector is linearly movable from a contact position, which allows a current to flow, into a disconnected position, which provides an electrically isolating gap between said plurality of contact pieces.

10. The switch disconnector arrangement according to claim 1, wherein:
    each of said outdoor bushings includes attachment means;
    said switch disconnector includes a switching pin, a stationary female contact, a sliding contact, and a hollow connecting rod firmly supporting said sliding contact on said attachment means; and
    said sliding contact moveably guides said switching pin for contacting said female contact.

11. The switch disconnector arrangement according to claim 10, further comprising:
    at least one driveshaft mounted in said attachment means;
    said driveshaft introducing a drive movement into said switch disconnector.

12. The switch disconnector arrangement according to claim 1, further comprising:
    an isolating rocker for introducing a drive movement into said switch disconnector;
    said isolating rocker made of a dielectric material.

13. The switch disconnector arrangement according to claim 1, wherein each of said outdoor bushings includes field control elements preventing partial discharges in said outdoor bushings.

14. The switch disconnector arrangement according to claim 1, further comprising a display element for indicating a position of said switch disconnector.

15. The switch disconnect or arrangement according to claim 1, wherein at least one of said outdoor bushings includes a current transformer.

16. The switch disconnector arrangement according to claim 1, further comprising at least one drive unit supported on one of said outdoor bushings for producing a drive movement.

17. The switch disconnector arrangement according to claim 1, further comprising a voltage transformer.

18. The switch disconnector arrangement according to claim 1, further comprising:
    at least three outdoor bushings provided for an additional phase of the electrical lines, said outdoor bushings attached to said enclosure in a gas-tight manner, each of said outdoor bushings including an outdoor connection for connecting the electrical lines of the additional phase, each of said outdoor bushings including a gas-insulated switch disconnector located therein.

* * * * *